United States Patent [19]

Povilaitis

[11] Patent Number: 5,600,300
[45] Date of Patent: Feb. 4, 1997

[54] ARRANGEMENT FOR INDICATING AN INDICATING AN INTERRUPTED ELECTRICAL CONNECTION

[75] Inventor: Frank Povilaitis, Troy, Mich.

[73] Assignee: Chrysler Corporation, Auburn Hills, Mich.

[21] Appl. No.: 275,686

[22] Filed: Jul. 15, 1994

[51] Int. Cl.$^6$ .................................................. B60Q 1/00
[52] U.S. Cl. ...................... 340/438; 180/271; 200/51.1; 280/735; 307/10.1; 340/687; 340/652; 439/188; 439/489
[58] Field of Search ...................................... 340/438, 687, 340/436, 652; 439/188, 490, 507, 596, 372, 489, 352, 510, 353, 509, 513; 200/51.1, 61.54; 180/271, 282; 280/735, 734; 307/10.1; 102/202.2, 202.9

[56] References Cited

U.S. PATENT DOCUMENTS

| | | | |
|---|---|---|---|
| 4,359,715 | 11/1982 | Langer et al. | 340/438 |
| 4,727,353 | 2/1988 | Ruhter . | |
| 4,769,586 | 9/1988 | Kazmierowicz . | |
| 4,781,393 | 11/1988 | Jeter . | |
| 4,906,203 | 3/1990 | Margrave et al. | 439/188 |
| 4,978,311 | 12/1990 | Oda et al. | 439/188 |
| 4,988,307 | 1/1991 | Muzslay | 439/188 |
| 5,034,727 | 7/1991 | Muraoka . | |
| 5,055,058 | 10/1991 | Nagusaka et al. | 439/188 |
| 5,072,391 | 12/1991 | Abe . | |
| 5,145,356 | 9/1992 | Minnis | 439/352 |
| 5,172,062 | 12/1992 | Eisermann . | |
| 5,263,872 | 11/1993 | Marpoe | 439/188 |
| 5,273,448 | 12/1993 | Myer et al. | 439/188 |
| 5,277,608 | 1/1994 | Oda | 439/188 |
| 5,370,543 | 12/1994 | Hamada et al. | 439/188 |
| 5,391,087 | 2/1995 | Fukuda | 439/188 |
| 5,401,180 | 3/1995 | Muzslay | 439/188 |

*Primary Examiner*—Nina Tong
*Attorney, Agent, or Firm*—Christopher A. Taravella

[57] ABSTRACT

An arrangement for indicating that an electrical connection is not established between first and second electrical circuit components includes a shorting contact which is disengaged upon first and second electrical connectors establishing a connection. As long as the shorting contact is engaged, current flows to an indicator lamp indicating that the first and second connectors are disengaged. This arrangement is utilized to notify the operator of a motor vehicle that a connector is disengaged from an air bag system diagnostic module and needs to be reconnected so that an igniter disposed within an air bag in the vehicle is connected to an inertia sensor which energizes the igniter in order to cause a gas expansion to inflate the air bag. When the connector is connected to the module, the lamp is not illuminated.

7 Claims, 3 Drawing Sheets

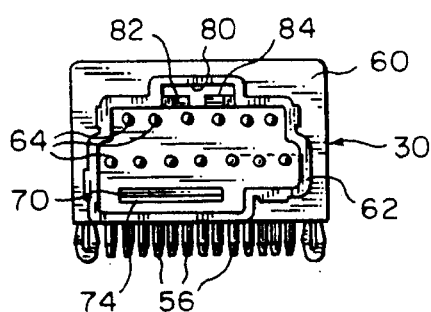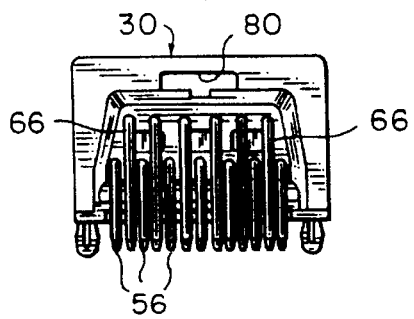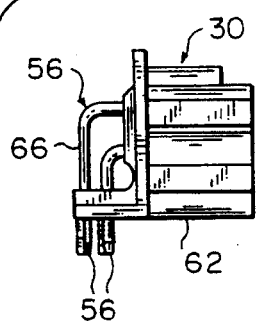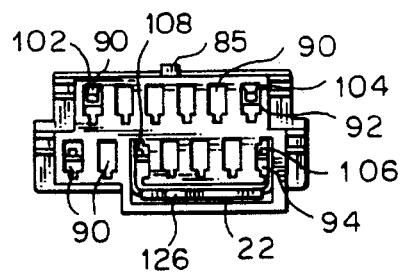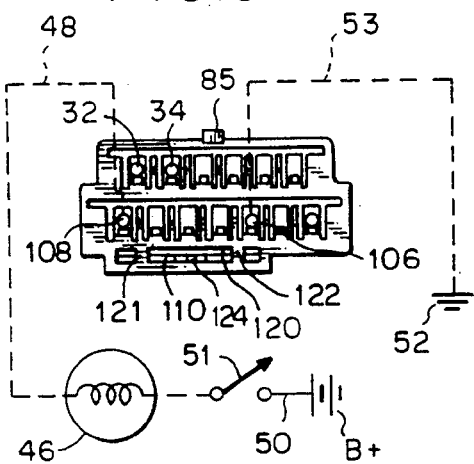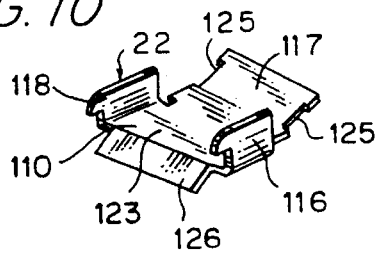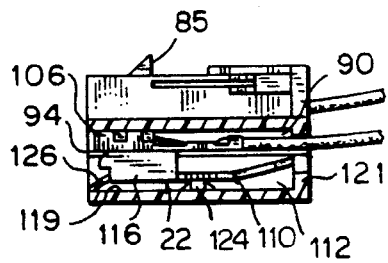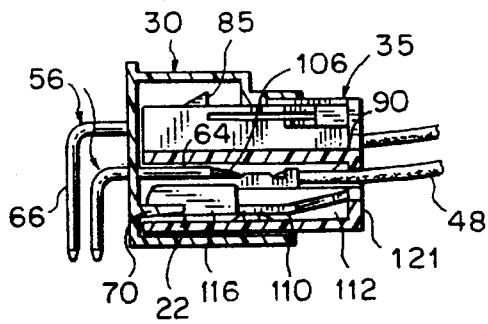

ARRANGEMENT FOR INDICATING AN INDICATING AN INTERRUPTED ELECTRICAL CONNECTION

FIELD OF THE INVENTION

The present invention is directed to an arrangement for indicating that an electrical connection is disconnected. More particularly, the present invention is directed to an arrangement for indicating that electrical connectors used in systems such as air bag system diagnostic modules are disconnected.

BACKGROUND OF THE INVENTION

In automotive vehicles, diagnostic modules are provided for self-diagnosing systems to activate devices for warning vehicle operators if a problem or fault occurs in the system which either will or will potentially effect the system's performance. No system currently exists for emitting a warning signal if a diagnostic module is disconnected due to either a loose wiring connector or an unconnected wiring connector.

Current vehicle systems presently use a bulb check which automatically turns on a warning light or signal for a given time when the ignition key is turned on or when the vehicle is started for a prescribed time. When the vehicle's operator does not see the light or another indicator during the key-on test, the operator knows that the system needs servicing. It is a disadvantage of this system that the driver must watch for the light during the bulb check interval. It is necessary to have this "key-on" test because present diagnostic modules are not configured to turn on warning lamps, buzzers or other devices when they are physically disconnected from the system.

Of specific interest with respect to this problem are connectors employed in air bag systems where the connectors can, for one reason or another, become disconnected. In air bag systems, an air bag is folded and packed into a housing mounted on a steering wheel for protecting a driver or in the dash board in front of the passenger. Air bags utilize an inflater operated by a squib heating element which is energized by an air bag operating circuit including a power source, deacceleration responsive sensors and a connector for electrically connecting the components of the system to one another. Upon the occurrence of a crash, current from the power source is applied to squib to the heat chemicals in the inflater which expands to inflate the air bar with resultant gases. If the air bag system diagnostic module connector is disconnected, the air bag will not operate in an emergency. Accordingly, it is important that the integrity of these electrical connections be maintained.

In U.S. Pat. No. 5,034,727, issued Jul. 23, 1991, to Muraoka, the problem of disconnected electrical connectors is addressed. However, in Muraoka, the arrangement is only useful to check the integrity of electrical connections on the assembly line. Muraoka is not concerned with notifying the vehicle Operator that air bag electrical connectors are disconnected so that the vehicle operator can take steps to correct the problem.

In view of the aforementioned situation, there is a need for an indicating means to inform operators, such as vehicle operators, that an electrical connection has been compromised.

SUMMARY OF THE INVENTION

It is an object of the present invention to provide a new and improved arrangement for indicating that the connection between components of an electrical connector has either not been made, or has been disconnected.

In view of this object and other objects, the present invention contemplates an arrangement for indicating that an electrical connection is not established between first and second electrical connection components, wherein the first connector has a plurality of first contacts and the second connector has a plurality of second contacts for establishing an electrical connection with the first contacts, upon being engaged therewith. A normally closed shorting contact is normally in engagement with a pair of the second contacts. A member on the first connector engages the shorting contact to disconnect the shorting contact from at least one of the two contacts upon joining the first connector to the second connector. An indicator is connected across the two contacts to a source of electric current for emitting a signal when the first and second connectors are disconnected and the shorting contact is engaged. When the shorting contact has been disengaged by the member on the first connector, no signal is emitted.

In accordance with a more specific aspect of the invention, an air bag system diagnostic module for vehicle self-diagnosing systems includes an indicating device which warns the vehicle operator of a fault in the system wherein the indicating device includes an electrical disconnected arrangement comprising the aforedescribed first connector, second connector, shorting contact and indicator.

In accordance with still a further aspect of the present invention, the first circuit component is an air bag system diagnostic module and the second circuit component is a wiring harness and its connections to a battery or ignition feed indicator lamp and ground circuits.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 5 is a back view of the first component of the assembly shown in FIG. 3;

FIG. 6 is a front view of the first component of the assembly shown in FIG. 3;

FIG. 7 is a side elevation of the first component of the assembly shown in FIG. 3;

FIG. 8 is a front view of the second component of the assembly shown in FIG. 4;

FIG. 9 is a back view of the second component of the connector assembly shown in FIG. 4;

FIG. 10 is a side elevation of the second component of the connector assembly shown in FIG. 4;

FIG. 11 is a perspective view of a leaf spring used as a shorting contact in the second connector of FIGS. 4 and 8–10; and FIG. 12 is a side elevation similar to FIG. 10 showing how the leaf spring of FIG. 11 deflects to open an indicating circuit when the first and second connector components of FIGS. 3 and 4 are joined, as in FIG. 2.

DETAILED DESCRIPTION

Figure 1:
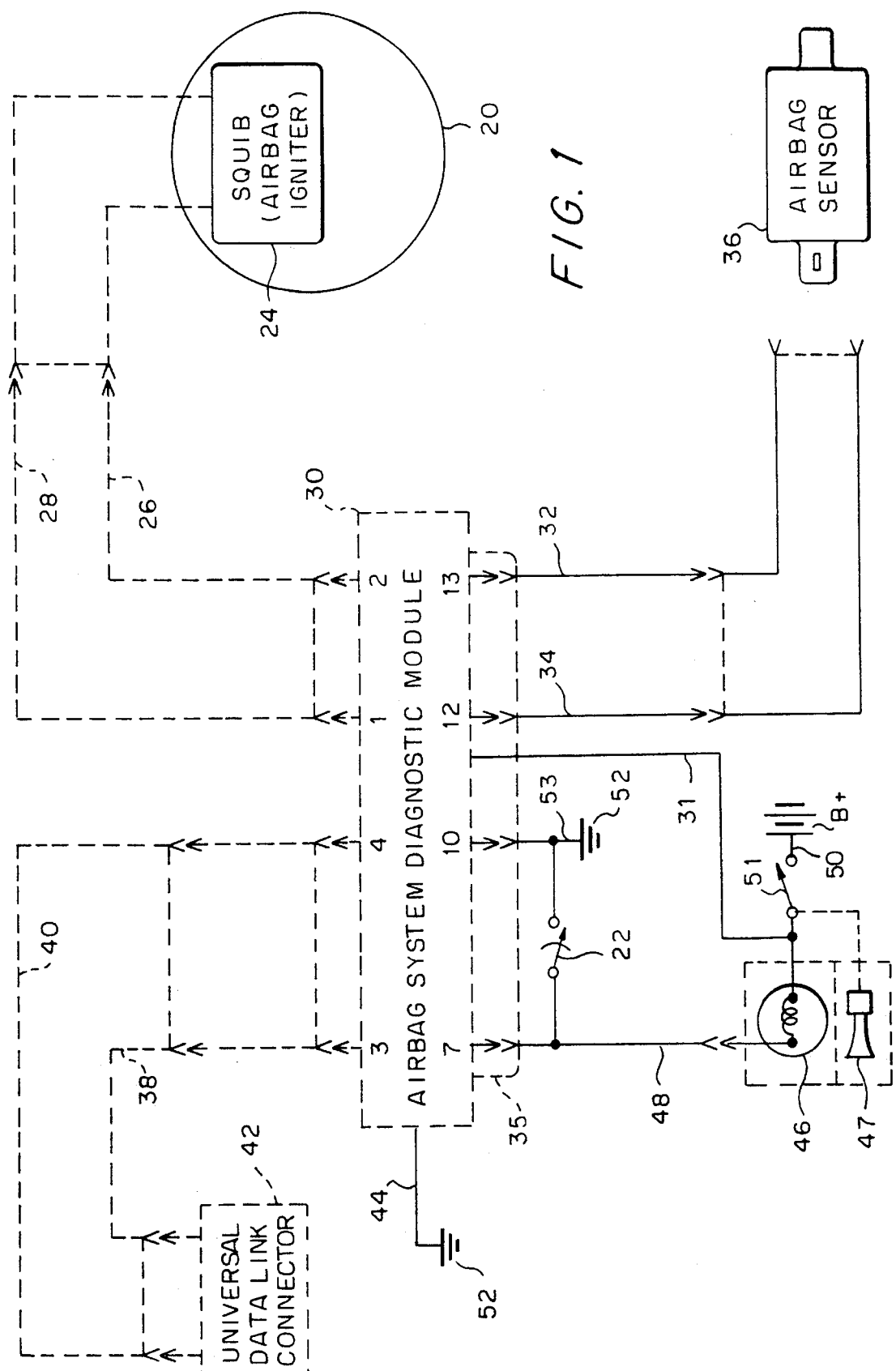
FIG. 1 is a diagrammatical illustration of an air bag system diagnostic module incorporating features of the present invention.

Referring now to FIG. 1, there is shown an arrangement currently used for controlling the deployment of an air bag 20 in an automobile, wherein the system utilizes a shorting bar 22 in accordance with the principles of the present invention. The system of FIG. 1 includes a squib air bag igniter 24 which is connected by two twisted pair lines 26 and 28 to an air bag system diagnostic module 30. The air bag system diagnostic module 30 is connected to a power feed line 31 and is connected by two lines 32 and 34 via a connector 35 to an air bag sensor 36 (only one of two air bag sensors is shown). When the air bag sensor 36 detects a collision, signals are sent over lines 32 and 34 to the air bag system diagnostic module 30 and over twisted pair lines 26 and 28 to the squib air bag igniter 24 in order to inflate the air bag 20. If lines 32, 34, 26, 28 or power feed 31 are for some reason mistakenly disconnected from the air bag system diagnostic module 30, then the squib air bar igniter 24 will not receive the inflation signal and the air bag will not inflate and thus not protect the passenger and driver. In addition, no continuously on warning lamp or device will warn the driver except the "bulb check" feature.

In accordance with one currently employed arrangement for passenger air bags, the air bag system diagnostic module 30 is disposed proximate the vehicle's park brake lever (not shown) and is connected by third and fourth twisted pairs 38 and 40 to a universal data link connector 42 located on the left hand side of the vehicle steering column (not shown).

The air bag system diagnostic module 30 is grounded to the vehicle chassis by ground line 44 and is connected to an indicator lamp 46 by a line 48. A line 50 connects the indicator lamp 46 to a vehicle's battery B +, preferably through an ignition switch 51. In accordance with the present invention, the shorting bar 22 connects the line 48 to ground 52 when the second connector 35 including lines 48 and 53 is not properly connected to the air bag system diagnostic module 30. When the shorting contact 22 is connected to ground, the lamp 46 is illuminated, notifying the operator of the vehicle that lines 48 and 53 are disconnected and that the air bag 20 will not deploy in case of an accident. Alternatively an audio signal emitted by an audio indicator 47 may be used in lieu of or in addition to the lamp 46. In accordance with the principles of the instant invention, when the lines 48 and 53 are properly connected, the shorting contact 22 is open, thereby keeping the lamp 46 extinguished.

Figure 2:
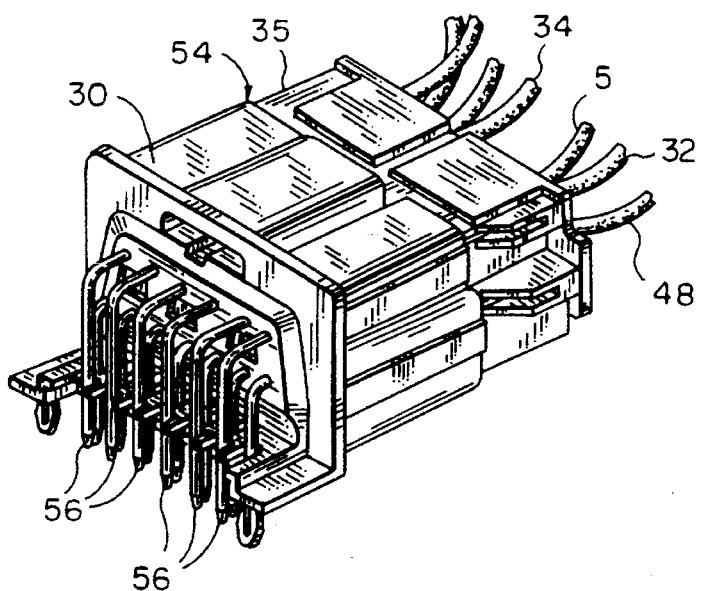
FIG. 2 is a perspective view of an connector assembly incorporating the features of the present invention.
Figure 3:
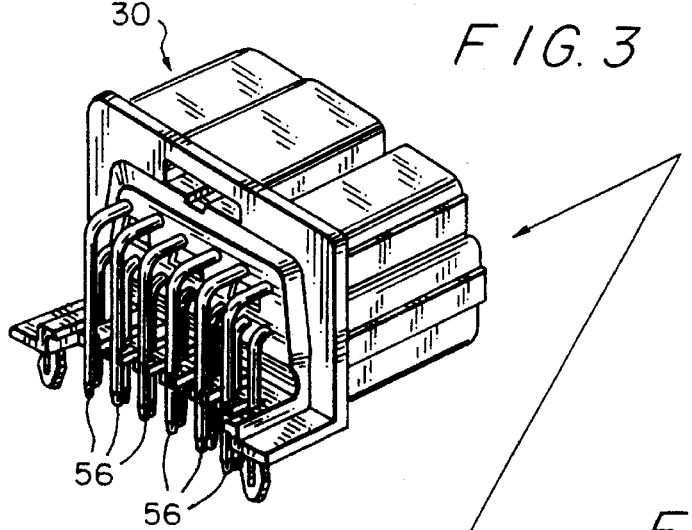
FIG. 3 is a perspective view of a first component of the assembly of FIG. 2.
Figure 4:
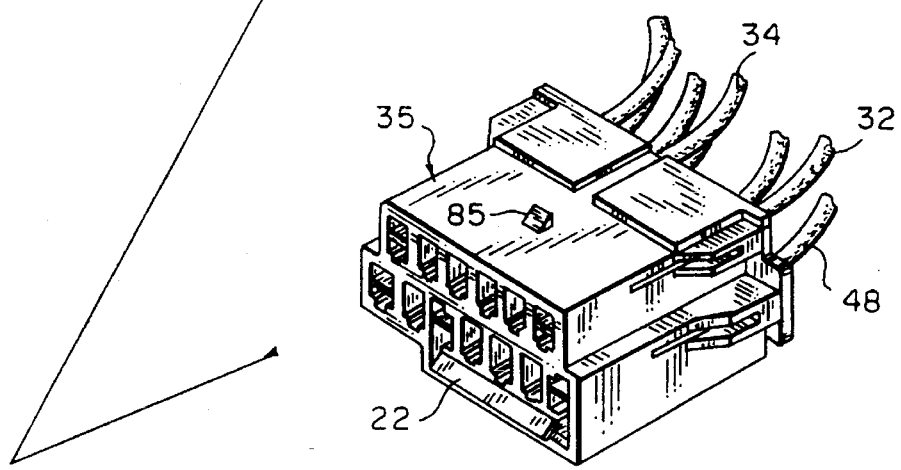
FIG. 4 is a perspective view of a second component of the assembly of FIG. 2.

Referring now to FIG. 2 where the specific configuration of the air bag system diagnostic module 30 and the connector 35 are shown in an assembly 54, it is seen that the control module has thirteen first contacts 56 which are in the form of L-shaped pins. As will be further explained hereinafter, the first contacts 56 are connected by second contacts within the second connector 35 to the lines 32, 34, 48 and 53. Referring now to FIGS. 3 and 4, it is seen that the air bag system diagnostic module 30 and connector 35 are separable with the air bag system diagnostic module 30 providing a first connector and the connector 35 providing a second connector which is received within the first connector. Since these first and second connectors 30 and 35 are separable, there is a possibility that the connectors might disconnect after delivery of the vehicle to the customer. There is also the possibility that disconnection of the connectors 30 and 35 might be overlooked during vehicle assembly or during maintenance of the vehicle.

Referring now to FIGS. 5–7 in combination with FIGS. 3 and 4, the air bag system diagnostic module 30, which forms the first connector, is shown in detail. The module 30 includes a base plate 60 upon which is mounted a projecting shell 62. Within the projecting shell 62 are the exposed shanks 64 of the L-shaped contacts 56 which, as is seen in FIGS. 6 and 7, have exterior shanks 66 which extend perpendicular to the shanks 64. Shell 62 has an axial dysymmetry so that there is only one orientation in which the second connector 35 (FIGS. 4 and 8–11) can seat within the shell when the first and second connectors 30 and 35 are assembled as is shown in FIG. 2.

Within the shell 62, there is a cam 70 (FIG. 5) which projects from the base plate 60. The cam 70 has an upper surface 72 which is perpendicular to the surface of the base plate 60 and a cam surface 74 which converges toward the perpendicular surface 72. As will be explained further hereinafter, the cam 70 is used to open the shorting contact 22 when the second connector 35 is properly seated within the shell 62 to establish an electrical connection with the exposed shanks 64 (FIG. 5) of pins 56.

Proximate to the top of the plate 60, there is provided a recess 80 flanked by a pair of spring arms 82 and 84 disposed at the bottom of the recess. The spring arms 82 and 84 are provided for latching the second connector 35 within the air bag system diagnostic module 30 which forms the first connector by engaging a detent 85 on the second connector (see FIGS. 8–10).

Referring now to FIGS. 8–11 in combination with FIGS. 2 and 4, it is seen that the second connector 35 has thirteen ports 90 arranged in an upper row 92 and a lower row 94 with six ports in the upper row and seven ports in the lower row. The thirteen ports 90 provide seating recesses for up to 13 female electrical terminals to wires such as wires 32, 34, 53, and 48 of FIGS. 1, 2, and 4. Not all of the ports 90 have female contacts inserted therein. As is seen in FIG. 8, female contacts 102 and 104 are inserted in the ports 90 of the top row 92 and are connected to lines 32 and 34, respectively, which are in turn connected to the air bag sensor 36 (see FIG. 1). In the lower row 94, there are two female contacts, 106 and 108, which are connected to lines 48 and 53, respectively (see FIG. 9). The line 48 is connected to bulb 46 which is in turn connected to the battery while line 53 is connected to ground 52. Disposed between the battery B +and the line 50 is the ignition switch 51 so that when the ignition circuit represented by the switch is turned on, current will flow through the bulb 46 to ground 52 and illuminate the bulb as long as the shorting contact 22 is closed.

In accordance with a preferred embodiment of the instant invention, and as best seen in FIGS. 10–12, the shorting contact 22 is in the form of a spring plate 110 which is seated within a recess 112 disposed beneath the lower row 94 of ports 90. Unitary with the spring plate 110 are a pair of normally extending contact projections 116 and 118 (see FIG. 11) which are normally biased by the spring plate into engagement with the contacts 106 and 108 (see FIG. 8) in their respective ports 90. The spring plate 110 has an upwardly bent portion 117 with a rear edge 120 which abuts struts 121 and 122 (FIG. 9), while an intermediate portion 123 of the spring plate is supported by a centrally located projection 124 extending from the floor 119 of the recess 112

(FIG. 10). A pair of notches 125 are positioned in the side of the bent portion 117 of the plate 110, which notches can engage with detents (not shown) in the second connector to help retain the plate within the connector.

Between the contact projections 116 and 118, a ramp 126 is provided which extends downwardly toward the floor 119 of the recess 112. As is seen in FIG. 12, when the second connector 35 is inserted into the shell 62 (FIGS. 5 and 7) of the air bag system diagnostic module or first connector 30, the cam surface 74 or the cam 70 (FIG. 5) within the shell 62 engages the ramp 126 (FIG. 11) and cams the plate 110 toward the floor 119 of the second connector 35 (FIG. 12). This causes the projecting contacts 116 and 118 on the spring plate 110 to disengage from the second contacts 106 and 108 in the second connector 35, thereby opening the circuit including the lamp 46 and preventing current from flowing through the lamp. As long as the connector 35 is properly seated within the shell 62, the cam 70 will keep line 48 disconnected from line 53, preventing current from flowing through the lamp 46. As soon as the second connector 35 is withdrawn, the spring plate 110 biases the contacts 116 and 118 back into contact with the second contacts 106 and 108, allowing current to flow through the bulb 46 when the ignition switch 51 is closed, indicating a disconnection fault.

By this arrangement, the operator of the vehicle is notified if the connector 35 is dislodged from the air bag system diagnostic module 30 upon turning the ignition switch 51 to the current-on position.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An arrangement for indicating that an electrical connection is not established between first and second electrical circuit components; the arrangement comprising:

a first connector associated with the first circuit component and having a plurality of first contacts;

a second connector associated with the second circuit component and having a plurality of second contacts for establishing an electrical connection with the first connector when engaged therewith;

a normally closed shorting contact normally in engagement with two of the second contacts;

a member on the first connector for engaging the shorting contact to disconnect the shorting contact from at least one of the two second contacts upon joining the first connector to the second connector, said member comprising a cam; and an indicator connected across the two second contacts and to a source of electric current for emitting a signal when the first and second connectors are disconnected, allowing the shorting contact to be engaged with the two second contacts, the indicator not emitting the signal when the first and second connectors are joined and the member on the first connector engages and disconnects the shorting contact from the two second contacts;

wherein the normally closed shorting contact is a unitary leaf spring that is spring biased into engagement with the two second contacts and has a ramp thereon for engagement by the cam;

wherein the unitary leaf spring includes two contact projections for engaging the two second contacts;

wherein the unitary leaf spring is a biased plate with the two contact projections extending in spaced relation therefrom to define a space therebetween, in which space the ramp is disposed.

2. The arrangement of claim 1, wherein the indicator is a visual indicator.

3. The arrangement of claim 1 wherein the indicator is an audible indicator.

4. In a diagnostic module for vehicular self-diagnosing systems wherein an indicating device warns a vehicle operator of a fault in the system, an electrical disconnect arrangement comprising:

a first connector connected to a first circuit component, and having a plurality of first contacts;

a second connector connected to a second circuit component and having a plurality of second contacts;

a normally closed shorting contact normally in engagement with two of the second contacts;

a member on the first connector for engaging the shorting contact to disconnect the shorting contact from at least one of the two second contacts upon joining the first connector to the second connector, said member comprising a cam; and an indicator connected across the two second contacts and to a source of electric current for emitting a signal when the first and second connectors are disconnected, allowing the shorting contact to be engaged with the two second contacts, the indicator not emitting the signal when the first and second connectors are joined and the member on the first connector engages and disconnects the shorting contact from the two second contacts;

wherein the normally closed shorting contact is a unitary leaf spring that is spring biased into engagement with the two second contacts and has a ramp thereon for engagement by the cam;

wherein the unitary leaf spring includes two contact projections for engaging the two second contacts;

wherein the unitary leaf spring is a biased plate with the two contact projections extending in spaced relation therefrom to define a space therebetween, in which space the ramp is disposed.

5. The electrical disconnect arrangement of claim 4, wherein the first circuit component is an air bag system diagnostic module.

6. The electrical disconnect arrangement of claim 5, wherein the indicator is a lamp mounted on a display panel within a vehicle.

7. The electrical disconnect arrangement of claim 5, wherein the indicator is an audible indicator.

* * * * *

UNITED STATES PATENT AND TRADEMARK OFFICE
CERTIFICATE OF CORRECTION

PATENT NO. : 5,600,300

DATED : February 4, 1997

INVENTOR(S) : Frank Povilaitis

It is certified that error appears in the above-identified patent and that said Letters Patent is hereby corrected as shown below:

Cover page at [54], and col. 1, lines 1-2, after first occurrence of "AN" delete ---INDICATING AN---

Signed and Sealed this

Fourteenth Day of July, 1998

*Attest:*

BRUCE LEHMAN

*Attesting Officer*     *Commissioner of Patents and Trademarks*